Aug. 2, 1932.     L. K. CHESWRIGHT     1,869,543
TRANSMISSION MECHANISM
Filed June 25, 1931
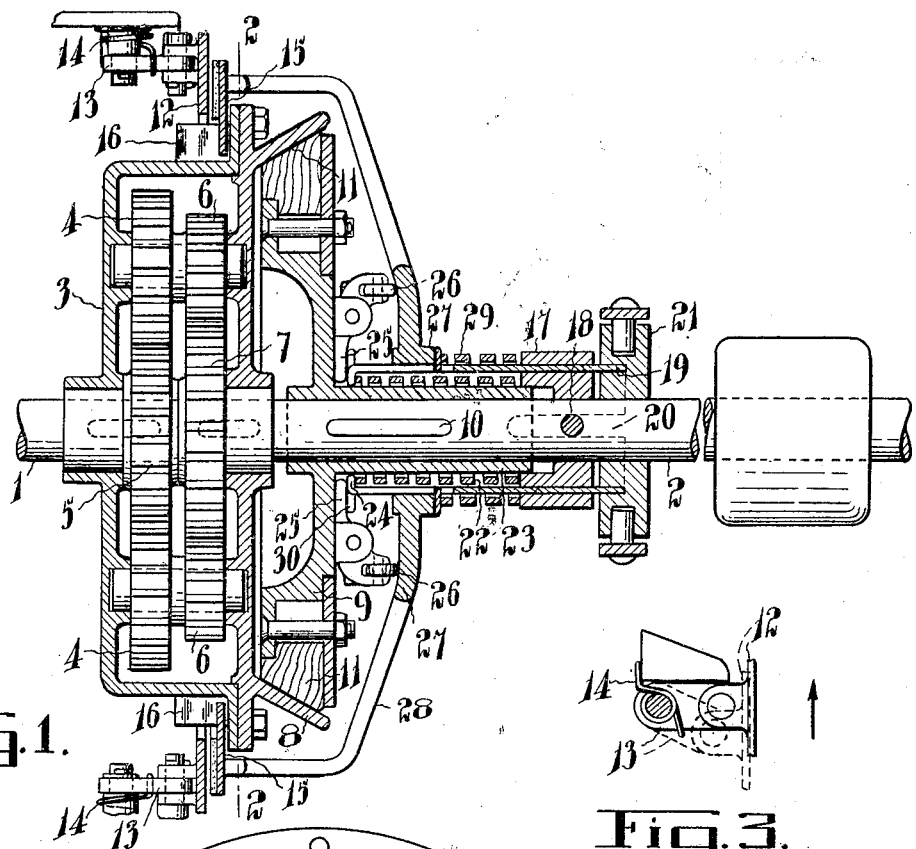
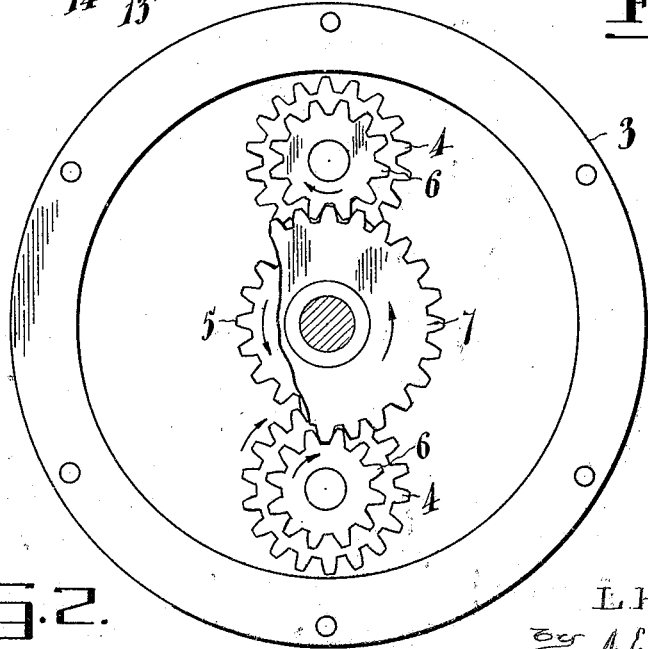
Inventor
L. K. Cheswright
By J. Edw. Maybee
ATTY.

Patented Aug. 2, 1932

1,869,543

UNITED STATES PATENT OFFICE

LEONARD K. CHESWRIGHT, OF SWANSEA, ONTARIO, CANADA

TRANSMISSION MECHANISM

Application filed June 25, 1931. Serial No. 546,768.

This invention relates to mechanism adapted to obtain a gradual engagement for direct drive between two alined shafts by the use of epicyclic gearing which will give a variable speed of the driven shaft from zero up to the speed of the driving shaft with increased torque at the lower speeds. In the co-pending application of Clifford Sifton and myself No. 546,748 such a mechanism is shown and described.

While the prior construction was well adapted for many purposes, the maximum torque obtainable from the speed reducing gear is not in practice attained as there are frictional losses involved at the lower speeds owing to frictional engagement between parts carried by driving and driven members respectively, and my present object is to devise a modification of the earlier construction which will avoid these frictional losses.

I attain my object by means of a construction which may be briefly described as follows. A driving and driven shaft arranged in alinement are connected by an epicyclic gear train including a rotatable part concentric with the shafts. Means are provided for applying a variable braking resistance between this part and a stationary part. Means are also provided for applying a variable braking resistance between the rotatable part and the driven shaft. By manually controllable means the first braking resistance is applied, and by a continued movement of the manually controlled means the second resistance may be gradually applied and the first resistance released.

The invention is hereinafter more fully described and is illustrated in the accompanying drawing in which Fig. 1 is a longitudinal section of gearing constructed in accordance with my invention;

Fig. 2 a cross section on the line 2—2 in Fig. 1; and

Fig. 3 a detail of one of the toggles supporting the stationary braking disk.

In the drawing like numerals of reference indicate corresponding parts in the different figures.

Referring to the drawing, 1 is the driving shaft and 2 the driven shaft arranged in alinement. On the driving shaft 1 is mounted the housing 3 which is free to rotate on the shaft. This housing carries the planetary gears 4 which mesh with the sun pinion 5 fast on the shaft 1. Concentric with and secured to the planetary gears 4 are the planetary gears 6, which mesh with the sun pinion 7 fast on the driven shaft 2. The housing 3 has formed thereon a female part 8 of a cone clutch. The male part 9 of the cone clutch is slidable on a keyway 10 on the driven shaft and is provided with the clutching surface 11.

A braking disk 12 is supported from a suitable stationary part. While this braking disk may be fixed in position, it is preferably held in place by toggles 13 which hold it in position as long as friction applied to its surface tends to rotate it in the direction indicated by arrow in Fig. 3. If friction tends to rotate it in the reverse direction, the toggles swing and allow the disk to move back axially. Coil springs 14 engage the toggles and their stationary support and tend to hold them in the position shown.

The annular braking disk 15 is supported on the housing 3 so as to be rotatable therewith but axially slidable thereon. For this purpose the housing is provided with a plurality of projections 16 fitting in notches formed in the inner periphery of the disk 15. It is evident that by moving this disk 15 into contact with the disk 12 that resistance will be applied to the rotation of the housing relative to the disk 12; so also by engaging the clutch parts 8 and 9 resistance is applied to the relative rotation of the housing 3 and the driven shaft.

To enable one resistance to be applied and the other released, or vice versa, I provide the following mechanism. A collar 17 is secured to the driven shaft 2 by means of the pin 18. A sleeve 19 is slidable in or on this collar, being provided with a slot 20 to pass the pin 18. The outer end of this sleeve is secured to a sliding collar 21 forming part of an ordinary shifting means. A coil spring 22 is positioned on the hub 23 of the braking member 9, one end of it bearing against the collar 17 while the other end bears against the flange 24 formed at the inner end of the sleeve 19. The function of this spring is to press the brake member 9 into contact with the brake member 8. For this purpose the inner end of the sleeve is shown as indirectly engaging the brake member 9. The direct engagement is with the inner ends of a plurality of levers 25 fulcrumed intermediate their ends on the brake member 9. The outer ends are shown as provided with anti-friction rollers 26 engaging the hub 27 of the spider 28, which spider is connected with the braking disk 15.

It follows then that, if the pressure of the spring 22 be applied to the levers 25, it normally holds the braking disks 15 and 12 out of engagement and the braking surfaces of the clutch parts 8 and 9 in engagement. If, however, the sleeve 19 be moved to the right in Fig. 1, the pressure on the braking surfaces of the clutch parts 8 and 9 is relieved and the levers 25 released to permit the spider 28 to be moved to engage the braking disks 12 and 15. This movement of the spider is effected by the coil spring 29 which engages the collar 17 at one end and at the other end the hub 27 of the spider.

When starting a vehicle employing this transmission the braking surfaces are all in the disengaged position, the shifter collar 21 having been moved fully to the right, thus engaging the projections 30 of the sleeve 19 with the hub of the spider 28 and drawing it and its connected parts to the right. The flange 24 of the sleeve 19 is also withdrawn from engagement with the levers 25 and pressure on the brake member 9 is relieved.

The collar 21 is then allowed to shift to the left, permitting the spring 29 to move the spider 28 to engage the braking surfaces 12 and 15 and press them together with increasing pressure as the spring 29 is allowed to act on the spider. The revolvable part 3 is thus held from rotation and a fulcrum is thus provided against which the gearing reacts so that the full benefit of reduction of gear ratio and increased power is thus obtained giving the desired increased torque at starting. If now the collar 21 be allowed to move further to the left under the influence of the coil spring 22, the levers 25 will be rocked to the position shown in Fig. 1, thus causing the engagement of the clutch parts 8 and 9.

As soon as the friction between the parts 8 and 9 is sufficient, the rotary part or housing 3 and the disk 15 are themselves carried round, the toggles 13 allowing the disk 12 to move back to release its frictional engagement with the disk 15 as soon as the latter is rotated in the same direction as the shafts, thereby preventing loss of power due to drag.

The frictional surfaces of the brake members 8 and 9 are pressed together with increasing force as the collar 21 is allowed to move to bring the pressure of the spring 22 fully to bear on the brake member 9. Variable speed is thus obtained as the relative movement of the two shafts depends on the extent of the movement of the rotatable part relative to the driving shaft. As soon as the friction between the friction surfaces of the brake members 8 and 9 is sufficient, the relative movement of the revolvable part and the driving shaft ceases and the shafts revolve at the same speed.

It will be seen, therefore, that by a continuous and progressive release of the spring pressure a driven shaft may be driven from a power shaft at gradually increasing speeds, giving increased torque at the start with a gradual reduction of the speed difference between the shafts until they are locked together to revolve at the same speed.

What I claim as my invention is:

1. In transmission mechanism, the combination of alined driving and driven shafts; an epicyclic gear train forming a driving connection between the two shafts including a rotatable part concentric with the shafts; means, initially inoperative, for applying a variable frictional resistance to the rotation of said part relative to the driven shaft; a stationary part provided with a braking surface; means, initially inoperative for applying a variable braking resistance to the rotation of the rotatable part relative to the stationary part; and manually controlled means adapted by a continuous uni-directional movement to first apply braking resistance to the movement of the rotatable part relative to the stationary part and subsequently apply braking resistance to the rotation of said part relative to the shafts and release the first mentioned braking resistance.

2. In transmission mechanism, the combination of a driving and a driven shaft; an epicyclic gear train interposed between the shafts to give a decreased gear ratio between the shafts and including a rotatable part concentric with the shafts; a stationary part; means, initially inoperative, for applying a braking resistance to the relative rotation of said rotary part and the stationary part; means, initially inoperative, for applying a braking resistance to the relative movement of the said rotary part and the driven shaft; manually controlled means adapted by a continuous uni-directional movement to first apply braking resistance to the rotation of the rotary member relative to the stationary part and thereafter to apply braking resistance to the rotation of said part relative to the driven shaft; and means for automatically relieving the first mentioned resistance at such time as the second-mentioned resistance has been increased sufficiently to take up the drive.

3. Transmission gearing as set forth in claim 1 in which the stationary part is movable longitudinally of the device and means are provided positioning it to provide braking resistance to rotation of the carrier in contrary direction to the shafts and permitting it to retract when the direction of rotation is the same as that of the shafts.

4. In transmission gearing, the combination of a driving and a driven shaft; an epicyclic gear train interposed between the shafts including planetary pinions; a planetary pinion carrier loose relative to the shafts and sun pinions fixed on the shafts; a stationary part; means for applying a braking resistance to the relative rotation of the carrier and the said stationary part; means for applying a braking resistance to the relative rotation of the driven shaft and the carrier; and manually controlled means for variably applying said braking resistances whereby when one is fully applied the other is fully released and vice versa, the stationary part being movable longitudinally of the device and provided with means positioning it to provide braking resistance to rotation of the carrier in contrary direction to the shafts and permitting it to retract when the direction of rotation is the same as that of the shafts.

5. Transmission gearing as set forth in claim 1 in which the means for applying the braking resistance to the relative rotation of the rotatable part and the stationary part comprises a ring slidably and non-revolubly mounted on the rotatable part, and the stationary part comprises an annular disk towards which the aforesaid disk is pressed by the manually controlled actuating means.

6. Transmission gearing as set forth in claim 1 in which the means for applying a braking resistance to the relative rotation of the driven shaft and the rotatable part comprises a brake member fixed to the rotatable part and a brake member slidably and non-revolubly mounted on the driven shaft.

7. Transmission gearing as set forth in claim 1 in which the means for applying the braking resistance to the relative rotation of the rotatable part and the stationary part comprises a ring slidably and non-revolubly mounted on the rotatable part, and the stationary part comprises an annular disk towards which the aforesaid disk is pressed by the manually controlled actuating means, and in which the means for applying a braking resistance to the relative rotation of the driven shaft and the rotatable part comprises a brake member fixed to the rotatable part and a brake member slidably and non-revolubly mounted on the driven shaft.

8. In transmission mechanism the combination of alined driving and driven shafts; an epicyclic gear train forming a driving connection between the shafts including a rotatable part concentric with the shafts; a braking disk axially slidable and non-revolubly mounted on the rotatable part; a stationary disk provided with a braking surface with which the said slidable braking disk can be engaged; a spider slidably mounted on the driven shaft carrying the said slidable braking disk; a clutch member fixed to the carrier; a clutch member slidably and non-revolubly mounted on the driven shaft; means for resiliently pressing the movable braking member against the disk and for subsequently pressing the movable clutch member into engagement with the clutch member on the rotatable part, including means for disengaging the braking surfaces as soon as the clutch members are fully engaged; and manually controllable means for applying or releasing the said resilient-pressure applying means.

9. In transmission mechanism the combination of alined driving and driven shafts; an epicyclic gear train forming a driving connection between the shafts including a rotatable part concentric with the shafts; a braking disk axially slidable and non-revolubly mounted on the rotatable part; a stationary disk provided with a braking surface with which the said slidable braking disk can be engaged; a spider slidably mounted on the driven shaft carrying the said slidable braking disk; a clutch member fixed to the carrier; a clutch member slidably and non-revolubly mounted on the driven shaft; a collar fixed on the driven shaft; a sleeve slidable on the collar, the spider aforesaid being slidable on the sleeve; manually controllable means for sliding the sleeve; a coil spring on the sleeve engaging the collar and spider; a coil spring within the sleeve engaging the collar and a shoulder within the sleeve, the springs serving to independently press the spider to move the braking disk of the rotatable part into contact with the stationary part and to press the sleeve to actuate the movable clutch member; means interposed between the movable brake member and the spider, engageable by the adjacent end of the sleeve and adapted to move the spider to disengage the aforesaid braking surfaces when the clutch is engaged; and a projection on the sleeve adapted to engage the spider to hold the braking surfaces out of engagement when the sleeve is moved to disengage the clutch.

10. Transmission gearing as set forth in claim 8 in which the stationary part is movable longitudinally of the device and means are provided positioning it to provide braking resistance to rotation of the carrier in contrary direction to the shafts and permitting it to retract when the direction of rotation is the same as that of the shafts.

11. Transmission gearing as set forth in claim 9 in which the stationary part is movable longitudinally of the device and means are provided positioning it to provide braking resistance to rotation of the carrier in contrary direction to the shafts and permitting it to retract when the direction of rotation is the same as that of the shafts.

Signed at Toronto, Canada, this 16th day of June, 1931.

LEONARD K. CHESWRIGHT.